(12) United States Patent
Leuthold

(10) Patent No.: US 9,482,510 B2
(45) Date of Patent: Nov. 1, 2016

(54) NOISE MEASUREMENT FOR MEASURED DISPLACEMENT

(71) Applicant: Seagate Technology LLC, Cupertino, CA (US)

(72) Inventor: Hans Leuthold, Santa Cruz, CA (US)

(73) Assignee: Seagate Technology, LLC, Cupertino, CA (US)

( * ) Notice: Subject to any disclaimer, the term of this patent is extended or adjusted under 35 U.S.C. 154(b) by 483 days.

(21) Appl. No.: 14/084,611

(22) Filed: Nov. 19, 2013

(65) Prior Publication Data

US 2014/0077822 A1    Mar. 20, 2014

Related U.S. Application Data

(63) Continuation-in-part of application No. 13/363,713, filed on Feb. 1, 2012, now Pat. No. 9,163,925.

(51) Int. Cl.
| | | |
|---|---|---|
| *G01R 27/02* | (2006.01) | |
| *G01B 7/14* | (2006.01) | |
| *G01B 7/02* | (2006.01) | |
| *G11B 5/55* | (2006.01) | |
| *G11B 5/596* | (2006.01) | |

(52) U.S. Cl.
CPC ............... *G01B 7/14* (2013.01); *G01B 7/023* (2013.01); *G11B 5/5582* (2013.01); *G11B 5/59627* (2013.01); *G11B 5/59694* (2013.01)

(58) Field of Classification Search
CPC ...... G01B 7/14; G01B 7/023; G11B 5/5582; G11B 5/59627; G11B 5/59694
See application file for complete search history.

(56) References Cited

U.S. PATENT DOCUMENTS

| | | | |
|---|---|---|---|
| 4,074,184 A | 2/1978 | Dechene et al. | |
| 4,983,916 A | 1/1991 | Iijima et al. | |
| 5,034,829 A | 7/1991 | Mahr | |
| 5,130,661 A | 7/1992 | Beck et al. | |
| 5,566,673 A * | 10/1996 | Shiono ................. | A61B 5/4064 600/407 |
| 5,736,800 A | 4/1998 | Iannello et al. | |
| 5,962,940 A | 10/1999 | Imlach | |
| 6,140,790 A | 10/2000 | Heine et al. | |
| 6,170,162 B1 | 1/2001 | Jacobsen et al. | |
| 6,201,322 B1 | 3/2001 | Heine et al. | |
| 6,505,968 B1 | 1/2003 | Fleury et al. | |
| 6,592,430 B1 | 7/2003 | Nakasuji et al. | |
| 6,603,221 B1 | 8/2003 | Liu | |
| 6,603,225 B2 | 8/2003 | Heine et al. | |
| 7,046,477 B2 | 5/2006 | Shibata | |
| 7,155,826 B2 | 1/2007 | Wehrfritz | |
| 7,370,524 B2 | 5/2008 | Hopkins | |
| 7,633,705 B2 | 12/2009 | Sudo | |
| 9,163,925 B1 | 10/2015 | Leuthold | |
| 2002/0074883 A1 | 6/2002 | Yamauchi et al. | |

(Continued)

OTHER PUBLICATIONS

Swann et al., Non-repeatable runout measurement and simulation of fluid lubricated spindles, IEEE Transactions on Magnetics, vol. 32, No. 3, pp. 1727-1732, 1996.*

*Primary Examiner* — Daniel Miller

(57) ABSTRACT

An apparatus including a first plurality of electrodes and a second plurality of electrodes is disclosed. Each electrode of the first plurality of electrodes is configured to measure an electric field associated with a position of a moving object. The second plurality of electrodes is disposed further away from the moving object in comparison to the first plurality of electrodes. The second plurality of electrodes is configured to measure a signal associated with ambient noise.

19 Claims, 11 Drawing Sheets

(56) References Cited

U.S. PATENT DOCUMENTS

| | | |
|---|---|---|
| 2005/0094523 A1 | 5/2005 | Wu |
| 2008/0037155 A1* | 2/2008 | Hirano .............. G11B 5/59627 360/75 |
| 2009/0091287 A1 | 4/2009 | Bastholm |
| 2009/0164145 A1 | 6/2009 | Koo et al. |
| 2009/0237282 A1 | 9/2009 | Hartlieb et al. |
| 2011/0141617 A1 | 6/2011 | Sudo |
| 2014/0077822 A1 | 3/2014 | Leuthold |
| 2014/0139237 A1 | 5/2014 | Leuthold |

* cited by examiner

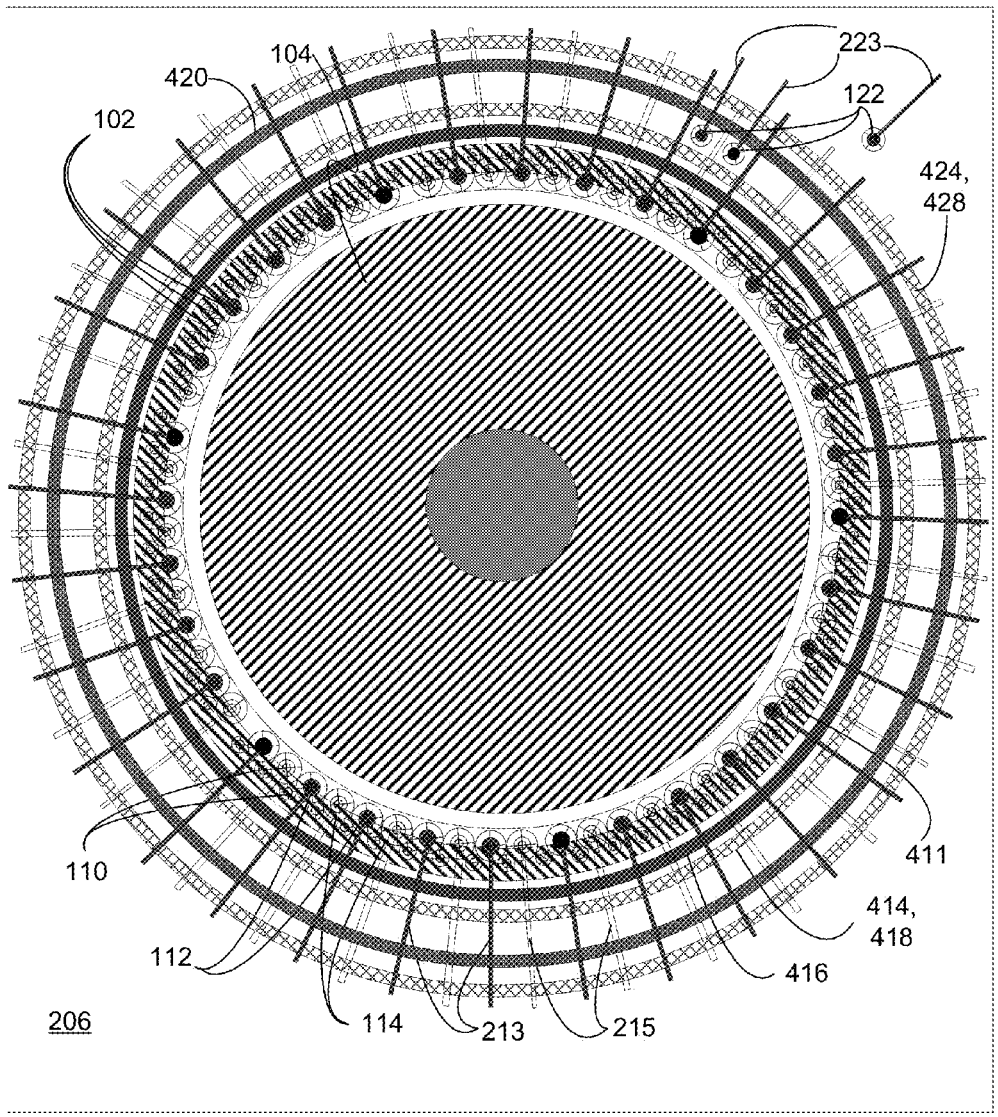
Figure 4A
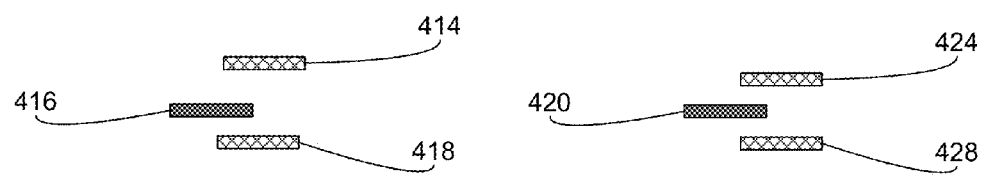
Figure 4BFigure 4C

NOISE MEASUREMENT FOR MEASURED DISPLACEMENT

RELATED APPLICATIONS

This application is a continuation-in-part of and claims priority to U.S. patent application Ser. No. 13/363,713, filed on Feb. 1, 2012, disclosure of which is incorporated by reference in its entirety by reference.

BACKGROUND

In magnetic recording media, as used in hard disk storage devices, information is written to and read from magnetic elements that represent digital bits. In order to increase the amount of information that can be stored within a given area, the size and distance between these magnetic elements may be reduced so that they may be more densely positioned. At the same time, the speed at which disks are written to and read from when preparing the disks for use by an end-user may be increased. In general, information regarding location as a function of time of the spin axis of the disks is useful in increasing performance.

Noise and vibration in the disks' environment may impact the performance, e.g., read/write capability, of magnetic recording media. The interferences caused by rapid disk rotation and other interferences may further cause random radial displacement or eccentricity of the rotating disk, resulting in non-repetitive run-out.

SUMMARY

A system for measuring ambient noise in the measured displacement is disclosed. An apparatus including a first plurality of electrodes and a second plurality of electrodes is disclosed. Each electrode of the first plurality of electrodes is configured to measure an electric field associated with a position of a moving object. The second plurality of electrodes is disposed further away from the moving object in comparison to the first plurality of electrodes. The second plurality of electrodes is configured to measure a signal associated with ambient noise.

BRIEF DESCRIPTION OF THE DRAWINGS

Embodiments of the present invention are illustrated by way of example, and not by way of limitation, in the figures of the accompanying drawings.

FIG. 4A is a plan view of floating rings and sensing rings according to some embodiments.

FIG. 4B is a cross sectional view of floating rings and sensing rings of displacement measurement electrodes according to some embodiments.

FIG. 4C is a cross sectional view of floating rings and sensing rings of electrodes for measuring ambient noise according to some embodiments.

DETAILED DESCRIPTION

Figure 1A:
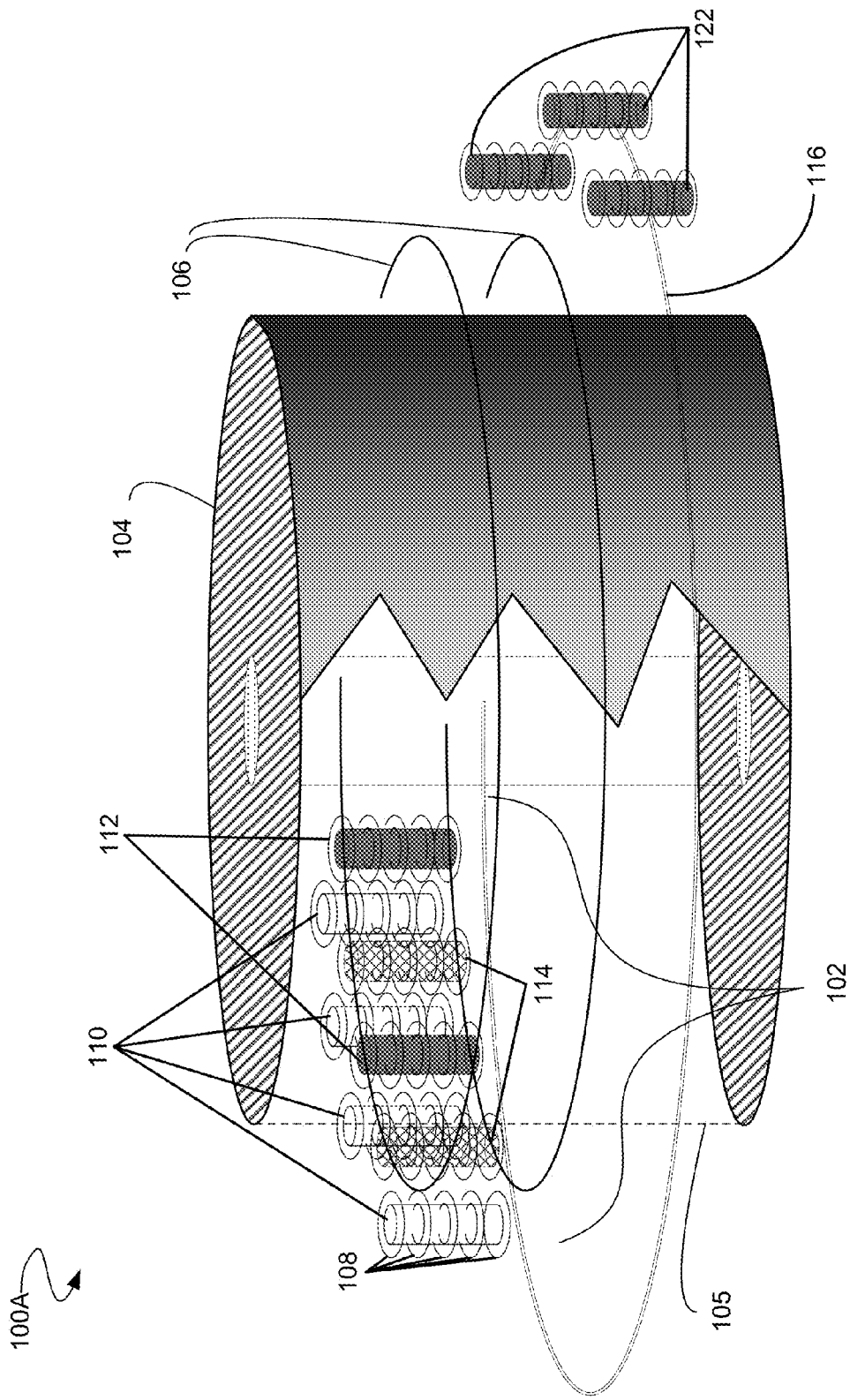
FIGS. 1A-1B are side view of sensor elements for measuring displacement and ambient noise according to some embodiments.

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

For expository purposes, the term "horizontal" as used herein refers to a plane parallel to the plane or surface of a substrate, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Embodiments described herein provide measurement methods and systems for determining the displacement or run-out of a rotating disk, for example, hard disks that store data. Moreover, embodiments herein provide for measurement of ambient noise, thereby allowing the ambient noise to be removed from the measured displacement. As such, amplitude, frequency, and phase of the correlated or non-correlated displacement of a rotating disk and its respective ambient noise can be measured. It is appreciated that embodiments described herein can be applied to any rotating object to determine rotational displacement.

Embodiments described herein are equally applicable to any rotating object. For example, embodiments described herein are equally applicable to rotating machinery, such as lathes or computer numerical control (CNC) machining centers used for the manufacturing of mechanical parts. Yet another range of applications might be found in the control of spinning mirrors used in laser scanners of cash registers and such, or with the control of electromagnetic bearings of fast spinning cryogenic pumps.

A rotating disk may include both repetitive (correlated) run-out and non-repetitive (uncorrelated) run-out. Non-repetitive run-out of the disk may be caused by random vibrations or other types of random disturbances in the environment. Repetitive run-out of the disk may be caused by an imbalance of a disk stack if the disk is included in a stack of disks.

In various embodiments, an electric field may be formed around the disk, or the body holding a stack of disks, by displacement sensors. For example, biasing electrodes may be biased to form an electric field. A first set of floating electrodes in close proximity of the moving object, e.g., rotor, may be used to measure changes in the electric field due to a displacement of the disk to determine the repetitive run-out and non-repetitive run-out of the rotating disk. The first set of floating electrodes is coupled to the moving object, e.g., rotor, and modulated. The first set of floating electrodes detects a capacitance resulting from displacement of the moving object. Accordingly, displacement of the moving object may be measured.

It is appreciated that the measured displacement may include ambient noise, e.g., from circuitries, from florescent light, electrical noise, etc. The ambient noise is measured in order to remove the ambient noise from the measured displacement. In one embodiment, ambient noise is measured using a second set of floating electrodes. The second set of floating electrodes is positioned further away from the moving object in comparison to the first set of floating electrodes. For example, if the first set of floating electrodes forms an inner ring surrounding the moving object, the second set of floating electrodes forms an outer ring surrounding the moving object. The second set of floating electrodes detects a signal that is not modulated by the moving body. Accordingly, the ambient noise is measured and can subsequently be removed from the measured displacement by the first set of floating electrodes.

The non-repetitive run-out of the disk may be orders of magnitude less than the repetitive run-out. For at least this reason, the signal corresponding to the non-repetitive run-out may be weak compared to the signal of the repetitive run-out. Moreover, due to the possible non-ideal positioning or structure of a printed circuit board (PCB) near the rotating disk or displacement sensors, additional noise such as ambient noise may be introduced to the overall signal. Such noise from a PCB and its elements may be repetitive noise because the noise corresponding to each position of the electric field will be known and therefore non-random. As a result of both the repetitive and non-repetitive run-out, the signal-to-noise ratio (SNR) of the non-repetitive run-out to the repetitive run-out may be low. It is appreciated, however, that the ambient noise may be measured and compensated for using the second set of floating electrodes further away from the moving object in comparison to the first set of floating electrodes.

Embodiments described herein allow for the measurement of a rotating disk's repetitive run-out as well as non-repetitive run-out (NRRO). To determine the non-repetitive run-out of the disk, an electric field may be formed around the disk and measurements of the changes in the electric field due to displacement of the disk may be oversampled to increase the SNR.

Oversampling is the process of sampling a signal with a sampling frequency that is equal to or greater than the Nyquist rate, or twice the highest frequency of the signal being sampled. For example, the signal measured by the first set of floating electrodes may be sampled at a frequency that is equal to or greater than twice the highest frequency of the non-repetitive run-out. To decrease the noise and increase the sampling resolution of the signal, a higher sampling frequency may be used. For example, when the sampling frequency is doubled, the sampling resolution is doubled, which results in half the noise after the signal is averaged or filtered down to the required rate.

In some embodiments oversampling a signal corresponds to each position of a plurality of positions of the electric field to determine the non-repetitive run-out component of the signal. For example, a first sample of the electric field's polarity and amplitude may be measured at a first position of the field and stored. The electric field may then be rotated to the next position where the next sample of the electric field's polarity and amplitude may be measured and stored. In this manner, the electric field may be rapidly stepped through a full revolution, e.g., 360 degrees, while the electric field's polarity and amplitude are measured and stored at each rotational position.

Once the electric field has completed a first full revolution, a second sample of the electric field's polarity and amplitude may be measured at the first position of the field. The average value of the previous and current samples of the electric field in each position may be stored. Accordingly, in the foregoing example, the average value of the first and second sample is stored in place of the value of the first sample. The electric field may then continue to rotate to complete a second full revolution while measurements of the electric field at each position are averaged or integrated with the previous measurement for each corresponding position, respectively.

Again, once the electric field has completed a second full revolution, a third sample of the electric field's polarity and amplitude may be measured at the first position of the field. The third sample may be averaged with the previously stored value, namely, the average of the first and second sample.

As the electric field completes additional rotations, the samples for each additional rotation may be averaged with the stored samples that correspond to each position of the electric field. As the stored values for each position continue to be integrated with sample values from additional positions, the repetitive noise may be determined with more accuracy. Once the repetitive noise has been determined, the repetitive noise can then be subtracted from the signal and the remaining signal may reveal the non-repetitive run-out component of the signal.

It is appreciated that the ambient noise may also be measured and compensated for in measuring displacement. The ambient noise may be measured using the second set of floating electrodes that is positioned further away from the moving object in comparison to the first set of floating electrodes. It is appreciated that the second set of floating electrodes may operate substantially similar to the first set of floating electrodes. However, the second set of floating electrodes measure the ambient noise rather than the displacement of the moving object because the detected signal by the second set of floating electrodes is not modulated by the moving object (partly because of its distance to the moving body). The measured ambient noise may be removed since it is also present in the measured displacement by the first set of floating electrodes. As such, ambient noise is removed from the displacement measurement.

In general, displacement measurement is very small in magnitude in comparison to repetitive signals and ambient noise. As such, removal of ambient noise, for instance, from the measured displacement results in a much more accurate measurement of displacement. In order to illustrate this point, a non-limiting analogy is provided. In this analogy, one may consider detection of moving bodies under similar conditions, e.g., dark room, using cameras. Using two identical cameras pointing in the same direction that are physically positioned in close proximity of one another that scan the area synchronically results in similar measurements including the measurement of ambient noise. However, one of the cameras may be unable to detect any small optical details if it is out of focus. In this example, both cameras are in the presence of poor lighting conditions, ambient electrical and thermal noise sources, etc. Since the overall light falling on each lens is the same and since the cameras are scanning in synchronous, electrical and thermal noise are the same for both cameras. However, there is a difference in optical details between the two since one camera is in focus and one is out of focus. As a result, the difference between the two cameras provides a much more enhanced detection of the moving object by removing the noise.

Similarly, in embodiments described herein, one set of sensors may be used to detect displacement and ambient noise whereas another set of sensors may be used not to measure displacement (out of focused in the analogy above), thereby measuring ambient noise. The difference between the two measurements is displacement of a moving object, e.g., a disk, without ambient noise.

In various embodiments, the sampling frequency may be increased beyond twice the highest frequency of the signal being sampled. For example, if the typical amplitude of the repetitive run-out is 1,000 times greater than the typical amplitude of the non-repetitive run-out, the signal may be oversampled 1,000 times more. In some embodiments, the more than one sample may be taken at each position of the electric field before the electric field rotates to the next position. For example, if the electric field rotates at 25 MHz, samples may be taken at 100 MHz so that four samples are taken at each position of the electric field.

In various embodiments, the dominant disk mode may have a non-repetitive run-out with a bandwidth of 2 kHz. If an 8-bit angular resolver is used (allowing for 256 sample points), and if the disk spins at 12,000 rpm (or 200 Hz), then the run-out samples may pass at a frequency of 256×200 Hz, or roughly 50 kHz. If the maximum typical repetitive run-out is on the order of $1 \times 10^{-3}$ inch and the non-repetitive run-out is on the order of $1 \times 10^{-6}$ inch, then the non-repetitive run-out is a factor of 1,000 smaller than the repetitive run-out. As a result, 1,000 samples may be taken at a rate of 4 per rotation at 200 Hz to filter the measurements of run-out to determine the non-repetitive run-out component of the measurements. Accordingly, the electric field will rotate at a rate of 800 kHz or 16 samples for every click of a register storing values corresponding to run-out. Further, there may be at least one full revolution of the electric field, e.g. 32 positions, for every one of the 16 samples collected. As a result, a basic clock rate of 32×800 kHz, or 25.6 MHz, may be used.

Figure 1B:
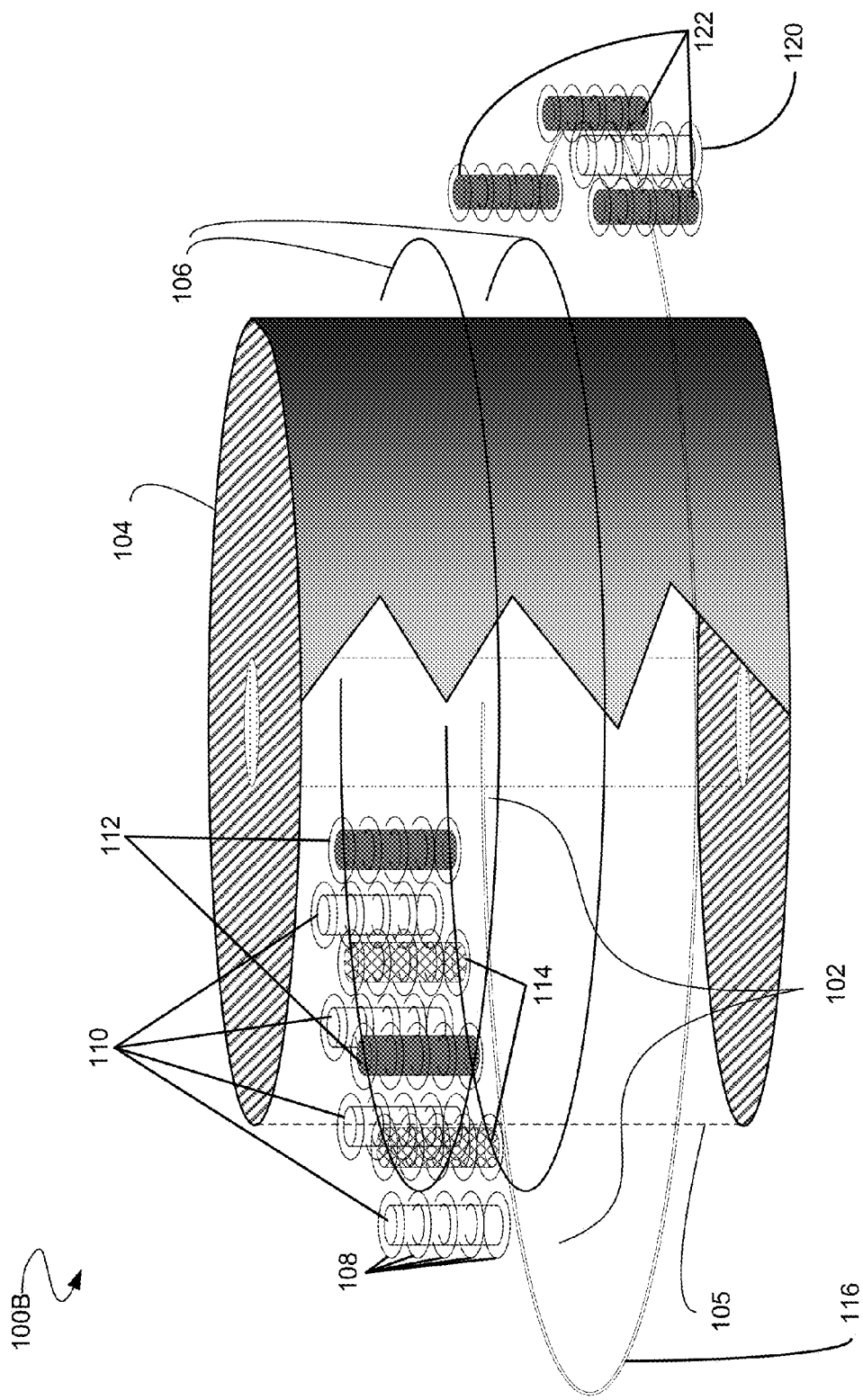

Referring now to FIGS. 1A-1B, side views of sensor elements for measuring displacement and ambient noise according to some embodiments are shown. More specifically, referring to FIG. 1A electrodes 102 adjacent to a rotating disk 104 according to an embodiment are shown. In an embodiment, the electrodes 102 may constitute elements of a displacement sensor to measure displacement of the rotating disk 104 and electrodes 122 may be used to measure ambient noise. The electrodes 102 may include grounding electrodes 110, floating electrodes 112, and biasing electrodes 114, functionality of which are described further below.

In various embodiments, the electrodes 102 may be generally positioned on the outside edge 105 of the disk 104 and on the same radial plane as the rotation of the disk 104. For example, with reference to the disk's 104 rotation, the electrodes 102 may follow the trajectory 106 shown in FIG. 1A. In this example, the floating electrodes 112 and the biasing electrodes 114 form an inner ring trajectory and the grounding electrodes 110 form an outer ring trajectory. The grounding electrodes 110 may form an outer ring that is concentric with and outside the disk 104. The floating electrodes 112 and biasing electrodes 114 may form an inner ring that is also concentric with and outside of the disk 104 but positioned inside the outer ring formed by the grounding electrodes 110. In an embodiment, the electrodes that form the outer ring or the inner ring may be distributed evenly so that each electrode is equidistant from adjacent electrodes. For example, the grounding electrodes 110 may be distributed in a pitched fashion along the outer ring. In further embodiments, the floating electrodes 112 and biasing electrodes 114 may be distributed in an alternating fashion along the inner ring.

It is appreciated that formation of two ring electrodes, e.g., an inner ring and an outer ring, is exemplary and not intended to limit the scope. For example, the floating electrodes 112, biasing electrodes 114, and the grounding electrodes 110 may form a single ring trajectory or alternatively they might form three rings. Furthermore, it is appreciated that the electrodes 102 may not form a ring per se, but rather have a structure other than a ring formation, e.g., rectangular, square, elliptical, random, etc.

According to some embodiments, electrodes 122 may be positioned further away from the rotating disk 104 in comparison to the floating electrodes 112. Electrodes 122 measure ambient noise such that the measured ambient noise can be removed from the measured displacement. Functionality of electrodes 122 and 102 are described below.

According to one embodiment, electrodes 122 may follow the trajectory 116 as shown in FIG. 1A. Electrodes 122 may also be floating electrodes similar to floating electrodes 112. It is appreciated that electrodes 122 may form an outer ring with respect to the floating electrodes 112. However, it is appreciated that the electrodes 122 may not necessarily form a ring structure and describing the electrodes 122 as a ring structure is for illustrative purposes only and not intended to limit the scope. For example, electrodes 122 may form a rectangular shape, a square shape, elliptical shape, randomly positioned, etc.

Figure 2:
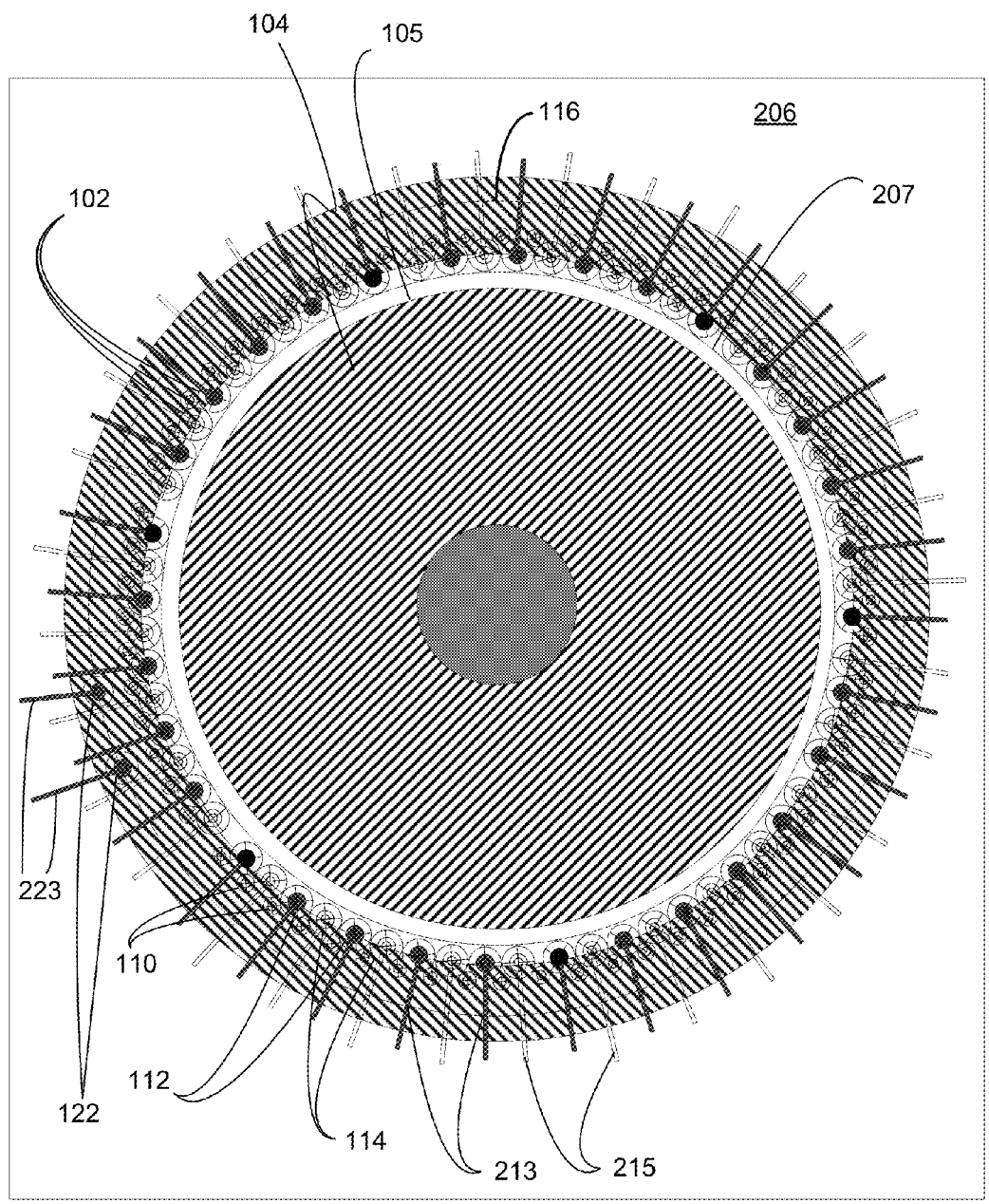
FIG. 2 is a plan view of sensor elements for measuring displacement measurement and ambient noise according to one embodiment.

In some embodiments, the rotating disk 104 may be radially surrounded or framed by the electrodes 102 and 122. In various embodiments, the electrodes 102 and 122 may be formed by or inside vias located inside a printed circuit board (PCB) that radially surrounds the disk 104 (FIG. 2). The vias may be used as biasing, floating, or sensing electrodes. The PCB may include one or more layers. For example, each via may include six pads 108 that correspond to a six PCB layers. It is, however, appreciated that six pads 108 may correspond to a five layer PCB and that discussion of embodiments with respect to a six layer PCB is exemplary and not intended to limit the scope. It is further appreciated that a PCB with less than five layers or more than six layers may be used.

It is appreciated that the floating electrodes 112 along with the biasing electrodes 114 and the grounding electrodes 110 are used to measure the disk 104 displacement. In contrast, the electrodes 122 may be used in conjunction with the grounding electrodes 110 to measure the ambient noise.

Referring now to FIG. 1B, system 100B is shown in accordance with one embodiment. System 100B is substantially similar to that of FIG. 1A. However, in system 100B additional grounding electrodes 120 are formed on an outer periphery of the floating electrodes 112 and the grounding electrodes 110. It is appreciated that the grounding electrodes 120 are used in conjunction with electrodes 122 in order to measure the ambient noise rather than using the grounding electrodes 110.

Referring now to FIG. 2, a plan view of sensor elements for measuring displacement measurement and ambient noise according to one embodiment is shown. In an embodiment, the rotating disk 104 may be radially surrounded by a PCB 206. Electrodes 102 and 122 are positioned on the PCB 206. It is appreciated that the use of PCB 206 is for illustrative purposes and not intended to limit the scope of the embodiments. Furthermore it is appreciated that the electrodes 102 and 122 may be formed by or inside vias but are not limited thereto. The rotating disk 104 includes an outer edge 105 and the PCB 206 includes an inner edge 207 that is concentric with and larger than the outer edge 105 of the disk 104.

While FIG. 2 labels only one set of electrodes 102 that includes floating electrodes 112, biasing electrodes 114, and grounding electrodes 110, it can be appreciated that the three displacement sensor elements may be a subset of a larger number of electrodes 102 as illustrated in FIG. 2. For example, the electrodes 102 may include the electrodes 110, 112, and 114. Similarly, while only two electrodes 122 are shown for measuring ambient noise, it is appreciated that many more than two electrodes 122 may be used (not shown).

The electrodes 102 of FIG. 2 correspond to the electrodes 102 of FIGS. 1A-1B and the electrodes 122 of FIG. 2 correspond to the electrodes 122 of FIGS. 1A-1B. For example, as shown in FIGS. 1A-1B, an outer ring of electrodes 122 in FIG. 2 surround the rings formed by the grounding electrodes 110, floating electrodes 112, and biasing electrodes 114. Furthermore, the grounding electrodes 110 form an outer ring with respect to the floating electrodes 112 and the biasing electrodes 114 of FIG. 2 that are arranged in an alternating fashion. It is appreciated that the electrodes 102 and 122 surround the rotating disk 104.

In one embodiment, there may be an even number of floating electrodes 112 and an even number of biasing electrodes 114. In various embodiments, the number of floating electrodes 112 may be equal to the number of biasing electrodes 114. For example, the electrodes 102 may include 32 floating electrodes 112 and 32 biasing electrodes 114. In some embodiments, the total number of floating electrodes 112 and biasing electrodes 114 may be equal to the number of grounding electrodes 110. For example, the displacement sensor elements may include 64 grounding electrodes 110 and 64 total floating electrodes 112 and biasing electrodes 114. It is appreciated that the number of electrodes 122 may vary. In one instance the number of electrodes 122 is equal to the number of floating electrodes 112 whereas in other embodiments the number of electrodes 122 is twice the number of floating electrodes 112. It is appreciated that the number of electrodes 122 may have no correlation to the number of floating electrodes 112.

Floating traces 213 may couple the floating electrodes 112 to sensing circuitry (not shown), while biasing traces 215 may couple biasing electrodes 114 to biasing circuitry (not shown). The sensing circuitry may be used to measure the voltage level of the floating electrodes 112 while the biasing circuitry may set the voltage levels of the biasing electrodes 114, thereby measuring the displacement of the disk 104. In contrast, traces 223 may couple electrodes 122 to a sensing circuitry (not shown) in order to measure the ambient noise. Functionality and operation of the sensing circuitry mentioned herein is described fully in FIGS. 4A and 4B below.

Figure 3A:
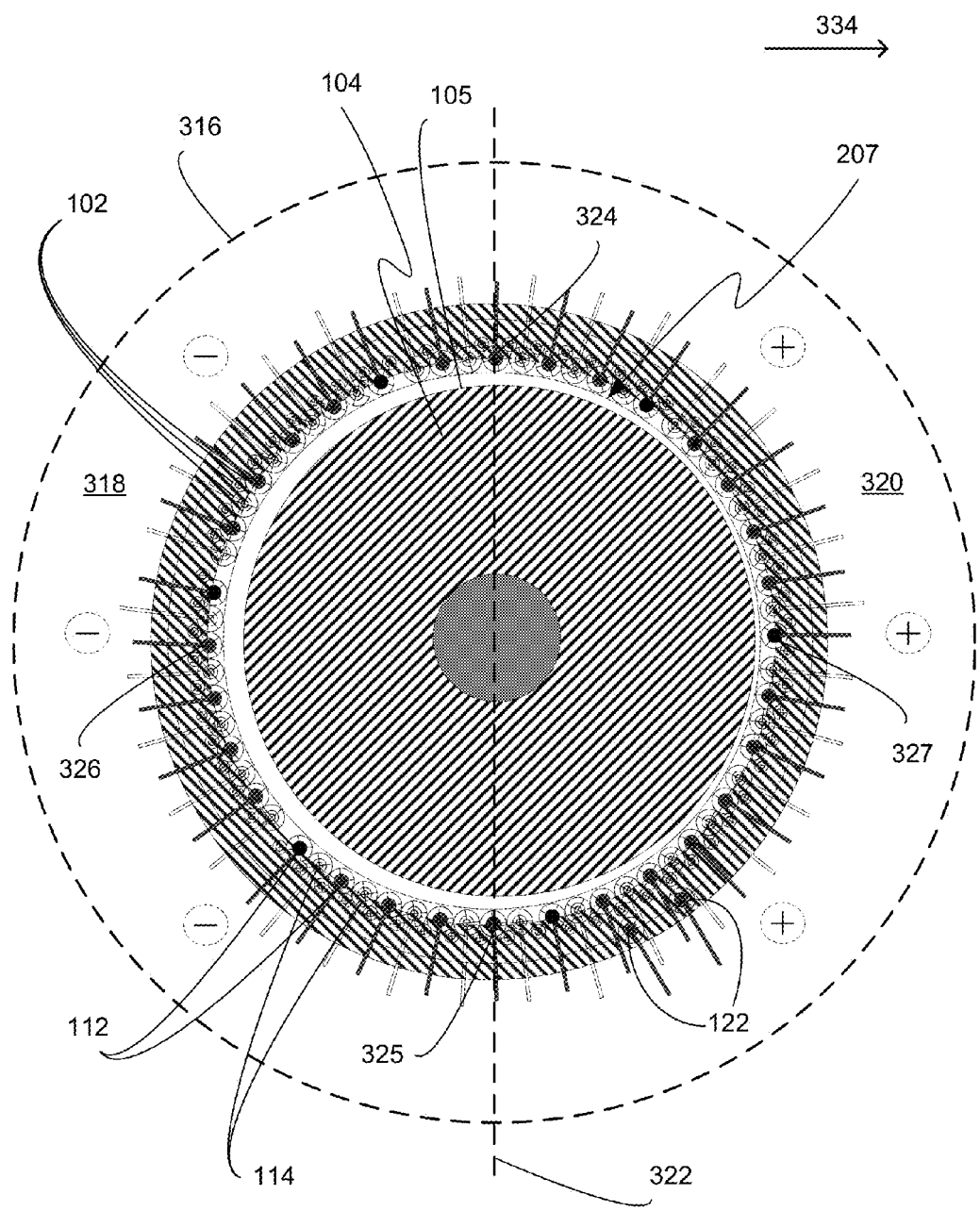
FIG. 3A depicts an electric field created by displacement sensors for measuring displacement and ambient noise according to an embodiment.

Referring now to FIG. 3A, an electric field created by displacement sensors for measuring displacement and ambient noise according to an embodiment is shown. According to one embodiment, electrodes 114 create an electric field 316. The ring of biasing electrodes 114 is divided into two circular halves where half of the biasing electrodes 114 are biased with a negative voltage while the other half of the biasing electrodes 114 are biased with a positive voltage. As a result, an electric field is created with a negatively-charged region 318 and a positively-charged region 320. A meridian line 322 depicts the interface between the negatively-charged region 318 and the positively-charged region 320.

If the disk 104 is centered with respect to the inner edge 207 of the PCB 206 (FIG. 2), the floating electrodes 324 and 325 that fall on the meridian line 322 may measure a net potential equal to zero since such electrodes are positioned between two fields of equal strength, namely the negatively-charged region 318 and positively-charged region 320. At the same time, the floating electrodes 326 and 327 that are positioned farthest from the meridian line 322 may measure a net potential equal to $-V_{center}$ and $+V_{center}$, respectively, since such electrodes are positioned within one side of the electric field 316 and far away from the opposite side of the electric field 316.

However, if the disk 104 is displaced from a center position such that the distance between the outer edge 105 of the disk 104 and the inner edge 207 of the PCB 206 (FIG. 2) is not constant at all points around the circular edges, the floating electrodes 324, 325, 326, and 327, may contemporaneously measure voltages that are different from the voltages measured when the disk 104 is centered.

For example, the disk 104 may be displaced in the direction 334. The floating electrodes 112 may measure a difference in voltage since the displacement 334 of the disk affects the strength of the electric field 316 at the location of each of the floating electrodes 112. More specifically, the dielectric properties of the disk's 104 material will be different from the dielectric properties of the matter that exists between the outer edge 105 of the disk 104 and the inner edge 207 of the PCB. As the disk 104 nears or evacuates an area, the area's dielectric properties will change, which in turn will affect the strength and coverage of the electric field 316.

Since the displacement of the disk 104 is in a direction 334 that is lateral to and not directly toward either of the floating electrodes 324 and 325, those electrodes will measure only a slight change in the strength of the electric field 316 in their location. However, the floating electrodes 326 and 327 that are located farthest from the meridian line 322 will not only measure a net potential different from $-V_{center}$ and $+V_{center}$, respectively, but the difference measured will be larger than the difference measured by the floating electrodes 324 and 325.

Thus, the disk 104 has moved away from floating electrode 326 and closer to floating electrode 327, thereby increasing the distance between the outer edge 105 of the disk 104 and the inner edge 207 of the PCB 206 (FIG. 2) at the point nearest floating electrode 326, and at the same time decreasing the distance between the outer edge 105 of the disk 104 and the inner edge 207 of the PCB 206 (FIG. 2) at the point nearest floating electrode 327. As a result of the displacement, the fraction of the potential $-V_{center}$ or voltage (e.g., electric charge) measured by floating electrode 326 may be less than the fraction of the potential $+V_{center}$ or voltage measured by the floating electrode 327.

Since the disk 104 has moved in a direction directly away from floating electrode 326 and directly toward floating electrode 327, the change in the amount of voltage that may be measured by floating electrodes 326 and 327 will be greater than the change measured by floating electrodes 324 and 325.

By measuring the change in voltage (e.g., electric charge) of the floating electrodes, the amount of disk displacement may be determined. For instance, in the orientation of the electric field 316, the voltage measurements of the floating electrodes 326 and 327 may be used to determine the displacement of the disk 104. Based on the amplitude and polarity of the measurement, the amount and direction of disk displacement may be determined. For example, the larger the voltage measurement sampled by the floating electrodes, the more the disk has displaced.

In various embodiments, the voltage (e.g., electric charge) measured by a subset of the floating electrodes 112 may be used to determine the strength of the electric field 316. For example, the floating electrodes that are farthest from the meridian line 322 may be used. For instance, in the orientation of the electric field 316 depicted in FIG. 3A, the voltage measurements of floating electrodes 326 and 327 may be used. In other embodiments, the floating electrodes 112 are electrically coupled so that the measurement of every floating electrode 112 will contribute to a net measurement of the electric field 316. The change in the amount of voltage that is measured will vary depending on the amount of disk displacement.

It is appreciated that the measured voltage includes ambient noise resulting from circuitries, florescent light, electrical noise, etc., or any combination thereof. Accordingly, ambient noise may be removed from the measured voltage after it is determined. In this embodiment, electrodes 122 are formed on an outer periphery of the disk 104 that are positioned further away in comparison to the floating electrodes 112, 327, 325, 324, and 326. Electrodes 122 may be floating electrodes in one embodiment.

The signal detected by the electrodes 122 is not modulated by the rotating disk 104, its displacement, and the electrical field created by the biasing electrodes 114 because electrodes 122 are further away from the rotating disk 104 in comparison to the floating electrodes 112, 327, 325, 324, and 326. Accordingly, the signal detected by electrodes 122 primarily comprises ambient noise rather than the voltage associated with the created electric field and the rotating disk 104, as measured by the floating electrodes 112, 327, 325, 324, and 326 that are associated with the disk displacement. In other words, the floating electrodes 112, 327, 325, 324, and 326 form a capacitance with the rotating disk 104 and the created electric field, thereby measuring displacement whereas capacitance formed between electrodes 122 and the rotating disk 104 with the created electric field is very weak, if any, in comparison, thereby measuring the ambient noise. It is appreciated that FIGS. 3B-3E may similarly use electrodes 122, as discussed with respect to FIG. 3A, to measure ambient noise but are not shown in FIGS. 3B-3E in order to avoid unnecessarily obscuring the embodiments of FIGS. 3B-3E.

Figure 3B:
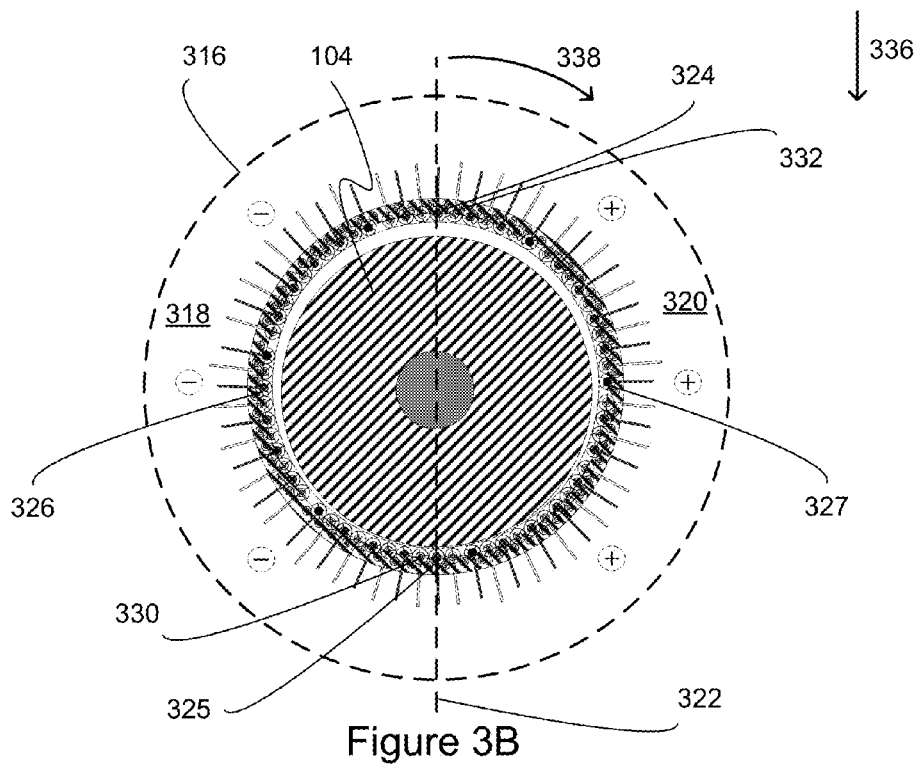
FIGS. 3B, 3C, 3D, and 3E depict the rotation of an electric field created by displacement sensors according to some embodiments.

FIG. 3B depicts the rotation 338 of an electric field 316 created by displacement sensors, according to an embodiment. Similar to the electric field 316 of FIG. 3A, the biasing electrodes located to the left of the meridian line 322 are biased to a negative voltage, thereby creating the negatively-charged region 318. Accordingly, biasing electrode 330 that is positioned within the negatively-charged region 318 is biased to a negative voltage.

Similarly, the biasing electrodes located to the right of the meridian line 322 are biased to a positive voltage, thereby creating the positively-charged region 320. Accordingly, biasing electrode 332 that is positioned within the positively-charged region 320 is biased to a positive voltage. The difference in voltage between the biasing electrodes positioned within the negatively-charged region 318 and positively-charged region 320 creates the electric field 316 in an initial orientation of the electric field 316.

Unlike FIG. 3A, if the disk 104 moves away from floating electrode 324 and toward floating electrode 325 in a downward direction 336, the electric field at floating electrodes 326 and 327 may be only slightly affected since the movement of the disk 104 would be lateral to those electrodes. As a result, floating electrodes 326 and 327 may measure only a slight change of the fraction of the potential difference between $+V_{center}$ and $-V_{center}$.

At the same time, floating electrodes 324 and 325 may also measure only a slight change in voltage since half of the disk 104 is still in the negatively-charged region 318 and the other half of the disk 104 is still in the positively-charged region 320. Accordingly, the measurement of changes in the electric field 316 on the floating electrodes 112 may be less when the disk 104 moves in a direction along the meridian line 322 of the electric field 316. Therefore in order to increase the change in potential measured by the electrodes, the orientation of the electric field 316 may be adjusted such that it rotates in the direction indicated by the arrow 338.

Figure 3C:
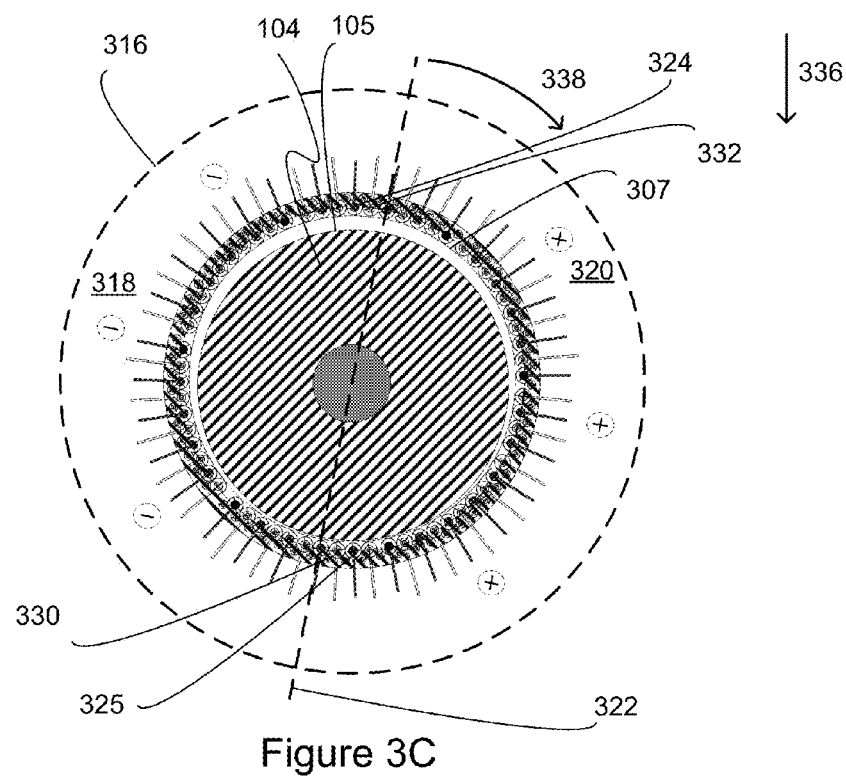

FIG. 3C depicts the rapid rotation 338 of an electric field 316 created by displacement sensors, according to an embodiment. Similar to the electric field 316 of FIG. 3A, the biasing electrodes positioned to the left of the meridian line 322 and within the negatively-charged region 318 are biased to a negative voltage. At the same time, the biasing electrodes positioned to the right of the meridian line 322 and within the positively-charged region 320 are biased to a positive voltage.

However, the driving protocol arrangement of negatively and positively biased biasing electrodes causes the electric field 316 to rotate in a clockwise manner. More specifically, biasing electrode 330, which was originally biased to a negative voltage, may be now biased to a positive voltage. Similarly, biasing electrode 332, which was originally biased to a positive voltage, may be now biased to a negative voltage. Meanwhile, the voltage of all of the other biasing electrodes may be maintained.

As a result of the new driving state of negatively and positively biased biasing electrodes, the electric field 316 rotates, e.g. in a clockwise manner. As the electric field 316 rotates, the weakest areas of electric field measurement, e.g. near the meridian line 322, rotate away from the areas where the outer edge 105 of the disk 104 is nearest or farthest from the inner edge 207 of the PCB 206. Correspondingly, the strongest areas of electric field measurement, e.g. the areas on the ring of electrodes farthest from the meridian line 322, rotate toward the areas where the outer edge 105 of the disk is nearest or farthest from the inner edge 207 of the PCB 206. As a result, the floating electrodes that may have been positioned in the weakest areas of electric field measurement may eventually be positioned in the strongest area of electric field measurement, which in turn increases the floating electrodes' measurement of the changes in the electric field 316 caused by the displacement 336.

For example, the floating electrodes 324 and 325 in FIG. 3B were least sensitive to the changes in the electric field 316 caused by the displacement 336 since they were positioned on the meridian line 322, where electric field measurement may be weakest. However, as the electric field 316 rotates in the direction indicated by the arrow 338, the floating electrodes 324 and 325 become more sensitive to the changes in the electric field 316 caused by the displacement of the disk 336 since the effect of the displacement 336 on the strength of electric field measurement is increased when the floating electrodes 324 and 325 are positioned in the strongest areas of electric field measurement.

As a result of the rotation of the electric field 316, the floating electrodes that are best positioned to measure changes in the electric field 316 due to the disk displacement will eventually be located in the strongest areas of electric field measurement. Once the strength of the electric field 316 in each rotational position is known, both the amount and direction of the disk displacement may be determined.

Figure 3D:
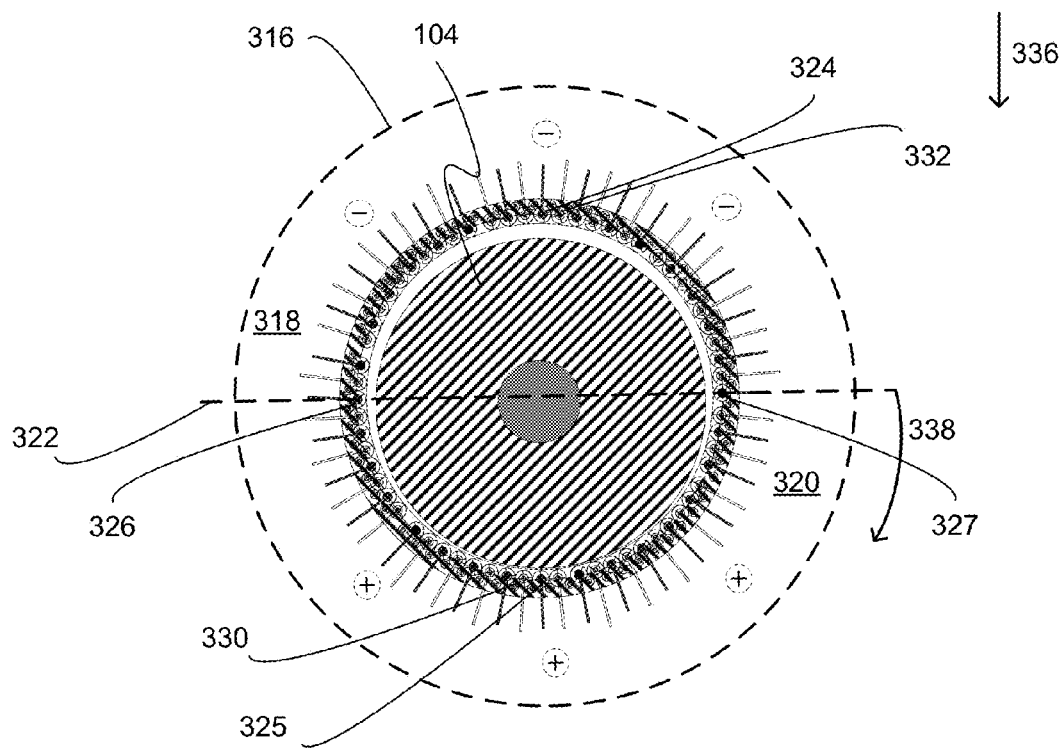

FIG. 3D depicts the rotation 338 of an electric field 316 created by displacement sensors, according to an embodiment. The electric field 316 of FIGS. 3A-3C may be caused to continue to rotate when the biasing of the biasing electrodes that are immediately adjacent to the direction of the meridian line's rotation are changed from positive to negative and from negative to positive in the fashion described above with reference to FIG. 3C. The electric field 316 depicted in FIG. 3D has completed a quarter-rotation through this manner.

Like FIGS. 3B-3C, the disk 104 is displaced from a center position since it has moved away from floating electrode 324 and toward floating electrode 325 in the direction 336. Unlike FIGS. 3B-3C, the floating electrodes 324 and 325 in FIG. 3D are positioned where electric field measurement may be strongest. As a result, floating electrodes 324 and 325 are most sensitive to changes in the electric field 316 caused by the displacement 336.

Since the floating electrodes 324 and 325 measure the largest amount of change in the electric field 316 in comparison to all of the other floating electrodes in every other rotational position of the electric field 316, it can be determined that the disk 104 has displaced in the displacement direction 336. In addition, the amplitude of the change in the electric field 316 may be used to determine the amount of disk displacement in the displacement direction 336. In this way, the direction and amplitude of the disk's 104 displacement in any direction may be determined by rotating the electric field 316 360 degrees and determining at which position the measured change of the electric field 316 is greatest.

Figure 3E:
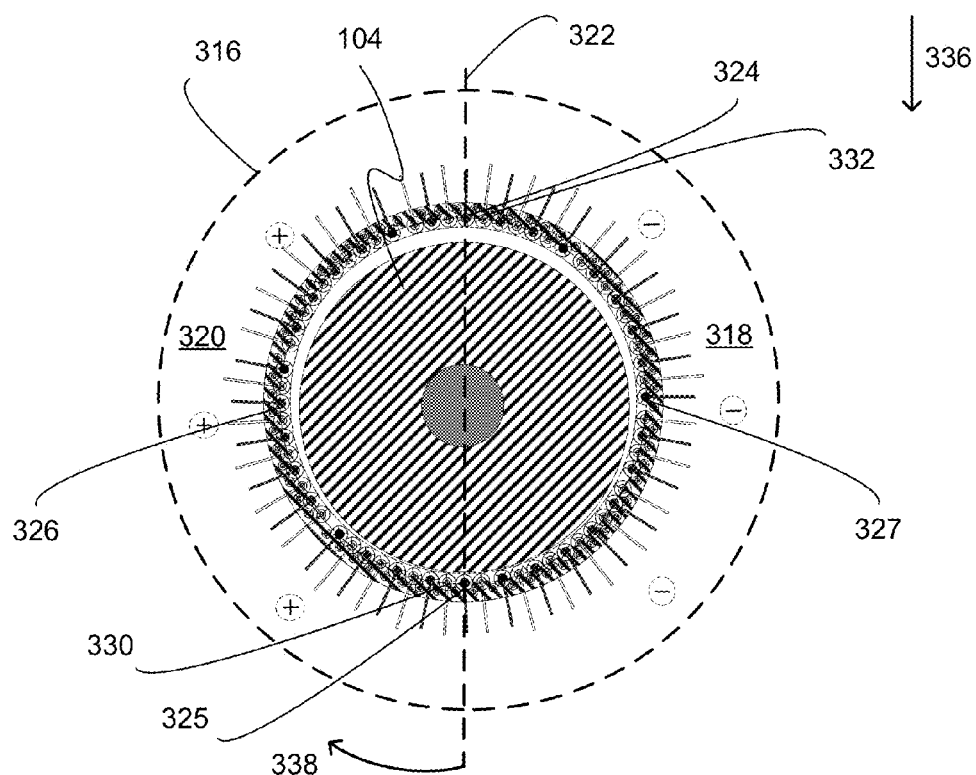

FIG. 3E depicts the rotation 338 of an electric field 316 created by displacement sensors, according to an embodiment. The electric field 316 in FIG. 3E has rotated 180 degrees in comparison to its position in FIG. 3A. Once the electric field 316 has completed such a half-rotation, the measurements made by the floating electrodes may be sufficient to determine the displacement of the disk 104. For example, not only may have the floating electrodes forming the half-ring below floating electrodes 326 and 327 taken measurements, but the floating electrodes forming the half-ring above floating electrodes 326 and 327 may have taken measurements as well. As a result, the displacement 336 of the disk may have been measured by all 32 floating electrodes positioned around the disk 104.

As the biasing electrodes continue to change in their biasing arrangement, the electric field 316 will eventually complete a full rotation. Accordingly, biasing electrodes 330 and 332 will once again be biased to negative and positive potentials, respectively. After one full rotation of the electric field 316, the floating electrodes 112 will have made 32 measurements. Using the 32 measurements, the displacement of the disk may be determined. However, embodiments as described herein can be applied where there are more or less floating electrodes and biasing electrodes, resulting in more or less displacement measurements per each electric field rotation. For example, to increase the accuracy of the displacement measurement, 64 floating electrodes and 64 biasing electrodes may be used to produce 64 measurements.

Conversely, when less accuracy is sufficient, 16 floating electrodes and 16 biasing electrodes may be used to produce 16 measurements. Even as few as 4 floating electrodes and 4 biasing electrodes, located above, below, to the right, and to the left of the disk, may be used to produce a rotating field that has 4 electric field rotational positions that may be used to measure the displacement of the disk. Even further, in such a configuration, the field may be rotated to only 2 positions. For example, the field may be rotated once to the orientation depicted in FIG. 3B and once to the orientation depicted in FIG. 3D. Since the floating electrodes may measure the X and Y displacement components of the disk, the overall displacement of the disk in any direction of the 2-dimensional radial plane may be determined.

In various embodiments, not all possible positions of the electric field may be used. For example, if there are 32 biasing electrodes, only 16 of the biasing electrodes may be used, resulting in only 16 electric field positions. As discussed above, even as few as 4 floating electrodes and 4 biasing electrodes may be sufficient to measure the displacement of the disk in some embodiments. Accordingly, even where there are 32 floating electrodes and 32 biasing electrodes, only 4 floating electrodes and 4 biasing electrodes may be used to measure the displacement of the disk.

In some embodiments, the biasing electrodes may be grouped. For example, the biasing electrodes may be "doubled-up" so that each time the biasing electrode configuration is changed, two biasing electrodes are changed to a positive potential and two biasing electrodes are changed to a negative potential. As a result, if there are 32 biasing electrodes, there will be 16 electric field positions.

While embodiments have been discussed with the number of floating electrodes being equal to the number of biasing electrodes, there may be more or less floating electrodes than biasing electrodes. For example, while there may be 32 floating electrodes, 64 biasing electrodes may provide 64 electric field rotational positions. Conversely, while there may be 32 biasing electrodes, 64 floating electrodes may provide higher-resolution measurements of the electric field. In some embodiments, the size of the floating electrodes may differ from the size of the biasing electrodes, such that larger biasing electrodes would result in a stronger electric field or larger floating electrodes would result in increased sensitivity to the electric field.

Embodiments as described herein can be applied where the rotation of the electric field 316 is either in a clockwise or counterclockwise direction. In further embodiments, the rotation of the electric field 316 may be either in the same or opposite direction as the rotation of the disk 104. In various embodiments, the electric field 316 may complete multiple rotations in the time that disk 104 completes a single rotation.

Referring now to FIG. 4A, a plan view of floating rings and sensing rings according to some embodiments is shown. In this embodiment a first floating ring 416 may couple some or all of the floating electrodes 112. The floating electrodes 112 may be used with sensing rings 414 and 418 to measure displacement of the disk 104. It is appreciated that a second floating ring 420 may couple some or all of the electrodes 122. The electrodes 122 may be used with sensing rings 424 and 428 to measure ambient noise according to some embodiments. The sensing rings 414, 418, the first floating ring 416, and the floating electrodes 112 may be coupled to a sensing circuit (shown in FIGS. 5A-5B) to measure displacement of the disk 104. It is appreciated that the sensing rings 424, 428, the second floating ring 420, and the electrodes 122 may be coupled to a sensing circuit (shown in FIGS. 5A-5B) to measure ambient noise. It is appreciated that in this embodiment at least one electrode 122 is shown to be positioned outside of the sensing rings 424 and 428 to illustrate that electrodes 122 may not necessarily form a ring structure as long as the electrodes 122 are positioned further away from the rotating disk 104 in comparison to the floating electrodes 112.

PCB 206 may include multiple layers, e.g., five layers, six layers, etc. In this embodiment, the PCB 206 may include 5 layers. The top layer (referred to herein as the first layer) may include the biasing traces 215 that couple the biasing electrodes 114 to the biasing circuitry (not shown) to create electric fields around the rotating disk 104. A second layer below the first layer may include the sensing rings 414, 424 (see FIGS. 4B-4C) and a grounding plane 411. The grounding plane 411 may insulate the floating electrodes 112, electrodes 122, floating traces 213, traces 223, the first floating ring 416, the second floating ring 420, and sensing rings 414, 418, 424, and 428 from each other and from the biasing traces 215 such that the voltage or charge transfer due to the movement of the disk is measured accurately without interference from the biasing electrodes 114 or other components. The grounding plane 411 may exist on all layers of the PCB 206.

A third layer below the second layer may include the floating traces 213 that couple some or all of the floating electrodes 112 with the first floating ring 416 (see FIG. 4B). It is appreciated that the third layer may also include the traces 223 that couple some or all of the electrodes 122 with the second floating ring 420 (see FIG. 4C). Accordingly, some or all of the floating electrodes 112 may be coupled with each other through the floating traces 213 and some or all of the electrodes 122 may be coupled with each other through traces 223. The floating electrodes 112, coupled through the floating traces 213 and the first floating ring 416, are further coupled to the sensing circuit (shown in FIGS. 5A-5B) for determining displacement of the disk 104. The electrodes 122, coupled through the traces 223 and the second floating ring 420, are further coupled to the sensing circuit (shown in FIGS. 5A-5B) for measuring ambient noise.

A fourth layer below the third layer may include the sensing rings 418 and 428 (see FIGS. 4B-4C) and another grounding plane 411. Finally, a fifth layer below the fourth layer may include a grounding plane 411. It is appreciated the configuration as described above having certain components on the same layer is illustrative and not intended to limit the scope of the embodiments. For example, the sensing rings 414 and 424 may be positioned on different layers rather than on the same layer. Similarly, sensing rings 418 and 428 may be positioned on different layers rather than on the same layer. Furthermore, the floating electrodes 112, floating traces 213, and the first floating ring 416 may be on a different layer of the PCB than electrodes 122, traces 223 and the second floating ring 420.

Referring now to FIG. 4B, the first floating ring 416 is positioned in the third layer of the PCB 206, disposed between the sensing rings 414 and 418. Referring now to FIG. 4C, the second floating ring 420 is positioned in the third layer of the PCB 206, disposed between the sensing rings 424 and 428.

Returning to FIG. 4A, the floating traces 213 on the third layer extend from the floating electrodes 112 to points that are either directly between the sensing rings 414 and 418 or to points that are radially passed the sensing rings 414 and 418. Accordingly, the floating traces 213 are disposed between two plates of a capacitor formed by the first and second sensing rings 414 and 418. As a result, the sensing rings 414 and 418 may be used to measure the changes in potential or charge transfers on the floating electrodes 112. The charge transfer occurs as an electrode switches from one potential to another, as discussed below. The net electric charge transferred is the product of the capacitor between a floating electrode and a biasing electrode, times the difference in potential resulting from switching of those electrodes.

According to one embodiment, the traces 223 on the third layer extend from the electrodes 122 to points that are either directly between the sensing rings 424 and 428 or to points that are radially passed the sensing rings 424 and 428. Accordingly, the traces 223 are disposed between two plates of a capacitor formed by the sensing rings 424 and 428. As a result, the sensing rings 424 and 428 may be used to measure the changes in potential or charge transfers on the electrodes 122. The measured potential or charge transfer represents the ambient noise.

It is appreciated that embodiments described herein may be applied where the interface between the floating and biasing electrodes is coupled to circuitry through other means. For example, the floating and sensing rings may not be used, but instead, the floating traces may couple directly with sensing circuitry (not shown). Further, embodiments described herein may be applied where the PCB includes more or fewer layers. For example, a PCB with 20 layers may be used.

Figure 5A:
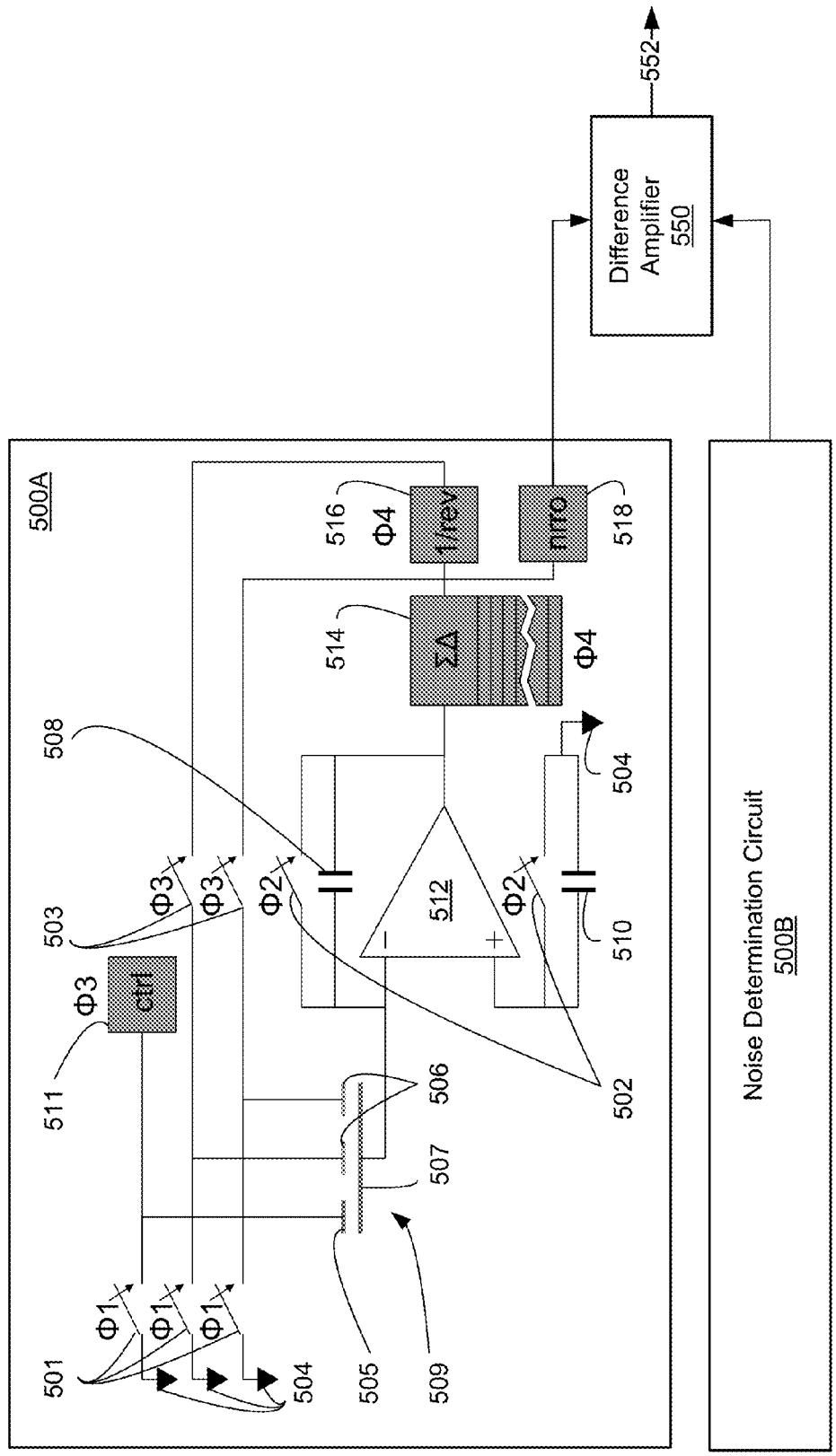
FIGS. 5A-5B are schematic diagrams of circuitry for measuring the displacement of a rotating disk and ambient noise according to some embodiments.

FIG. 5A is a schematic diagram of circuitry for measuring the displacement of a rotating disk and ambient noise according to some embodiments. FIG. 5A depicts a circuit 500A that may be used to determine the displacement of a rotating disk based on information provided by displacement sensors, according to an embodiment. Noise determination circuitry 500B is substantially similar to that of circuit 500A and is used to measure ambient noise. FIGS. 5C and 5D depict a circuit timing diagram for the circuit 500A of FIG. 5A that determines the displacement of the rotating disk based on the information provided by the displacement sensors, according to an embodiment. The schematic diagram of the circuit 500A in FIG. 5A will be discussed with reference to the circuit timing diagrams in FIGS. 5C and 5D.

FIGS. 5C and 5D show two full clock cycles 530 and 532 of a non-overlapping clock, where both cycles 530 and 532 follow the same timing pattern. For instance, clock signal $\phi 4$ may go high for each time labeled 'd' in both the clock cycles 530 and 532, clock signal $\phi 2$ may go high for each time labeled 'e' in both the clock cycles 530 and 532, and so on.

Circuit 500A includes electrical ground nodes 504 and switches 501, 502, and 503. When a clock signal goes high, the switches corresponding to that clock signal may close, i.e., shorting the connection. Conversely, when a clock signal goes low, the switches corresponding to that clock signal may open.

Circuit 500A also includes biasing electrodes 505 which may correspond to the biasing electrodes 114 of FIGS. 1-4 that are controlled by the controller 511. The sampling electrodes 506 may correspond to or may be coupled with the sensing rings 414 and 418 of FIGS. 1-4. The floating electrodes 507 may correspond to or may be coupled with the floating ring 416 of FIGS. 1-4. Accordingly, the capacitor 509 may correspond to the capacitor assembly formed between the sensing rings 414 and 418, the biasing electrodes 505, and the floating electrodes 507. Additional capacitive components between each of the sensing rings 414 and 418, the biasing electrodes 505, and the floating electrodes 507, are not shown for clarity of the figure.

In reference to FIG. 5C, one clock period may begin at time 'a' in clock cycle 530. At time 'a,' signal φ3 goes low causing the switches 503 to open. As a result, biasing electrodes 505 are caused to float. Approximately at the same time, signal φ4 goes low in preparation for its next rising edge. At time 'b,' signal φ2 goes low causing the switches 502 to open. Consequently, the capacitors 508 and 510 are caused to float, allowing the capacitors 508 and 510 to sample the next electric field charge created by the biasing electrodes 505 and altered by the displacement of an object within the electric field.

At time 'c,' signal φ1 goes high causing the switches 501 to close. As a result, biasing electrodes 505 and sampling electrodes 506 are shorted to the ground nodes 504. At the same time, the bias is set, which results in a charge transfer across the floating capacitors 509, which is sampled by the capacitors 508 and 510.

At time 'd,' signal φ4 goes high, causing a sigma-delta converter 514 to acquire the sign of the resulting charge on an integrator 512 for further processing. In various embodiments, the integrator 512 may be an operational transconductance amplifier with input and output terminals linked by capacitors 508 and 510. The integrator 512 may integrate a previously stored value in the sigma-delta converter 514 with a currently measured value and store the integrated value in the sigma-delta converter 514. At time 'e,' signal φ2 goes high, causing the switches 502 to close. Accordingly, the charge levels on the sample and hold capacitors 508 and 510 are reset as a result of the short.

At time 'f,' signal φ1 goes low, causing the switches 501 to open, and at time 'g,' signal φ3 goes high, causing the switches 503 to close. As a result, the biasing potentials on the biasing electrodes 505 and sampling electrodes 506 are set. At this time, the biasing electrodes 505 may be biased to rotate the electric field to the next electric field rotation.

When signal φ3 goes low once again at time 'a' in the next clock cycle 532, the switches 503 open. Accordingly, the biasing electrodes 505 float once again, which ends the previous clock cycle 530 and initiates the next clock cycle 532.

It should be appreciated that different timing diagrams may describe the operation of circuit 500A. For example, in reference to FIG. 5D, one clock period may begin at time 'a' in clock cycle 530. At time 'a,' signal φ2 goes low, causing the switches 502 to open. Consequently, the capacitors 508 and 510 are caused to float, allowing the capacitors 508 and 510 to sample the next electric field charge created by the biasing electrodes 505 and altered by the displacement of an object within the electric field. At time 'b,' signal φ3 goes low causing the switches 503 to open. As a result, biasing electrodes 505 and sampling electrodes 506 are caused to float. Approximately at the same time, signal φ4 goes low in preparation for its next rising edge.

At time 'c,' signal φ1 goes high causing the switches 501 to close. As a result, biasing electrodes 505 and sampling electrodes 506 are shorted to the ground nodes 504. This shorting to ground changes the potential of the biasing electrodes 505 and sampling electrodes 506, which results in a charge transfer across the floating capacitors 509, which is sampled by the capacitors 508 and 510.

At time 'd,' signal φ4 goes high, causing a sigma-delta converter 514 to acquire the sign of the resulting charge on an integrator 512 for further processing. In various embodiments, the integrator 512 may be an operational transconductance amplifier with input and output terminals linked by capacitors 508 and 510. The integrator 512 may integrate a previously stored value in the sigma-delta converter 514 with a currently measured value and store the integrated value in the sigma-delta converter 514. At time 'e,' signal φ2 goes high, causing the switches 502 to close. Accordingly, the charge levels on the sample and hold capacitors 508 and 510 are reset as a result of the short.

At time 'f,' signal φ1 goes low, causing the switches 501 to open, and at time 'g,' signal φ3 goes high, causing the switches 503 to close. As a result, the biasing potentials on the biasing electrodes 505 and sampling electrodes 506 are set. At this time, the biasing electrodes 505 may be biased to rotate the electric field to the next electric field rotation.

When signal φ2 goes low once again at time 'a' in the next clock cycle 532, the switches 502 are caused to open. Accordingly, the capacitors 508 and 510 are caused to float once again, which ends the previous clock cycle 530 and initiates the next clock cycle 532.

In various embodiments, the circuit in FIG. 5A may be operated in accordance with a clock cycle of the timing diagrams in FIGS. 5C and 5D for each rotational position of the electric field. For example, 32 biasing electrodes 505 may create 32 electric field positions. For each electric field position, the circuit may complete one clock cycle. As a result, an electric field may be created for each of the 32 positions and the electric field may be sampled for each of the 32 positions.

In some embodiments, the sigma-delta converter 514 may include multiple registers to store a value corresponding to each position of the electric field. For example, if there are 32 electric field positions, the sigma-delta converter 514 may include 32 registers to store an electric field strength value that corresponds to each position. In various embodiments, when the electric field has completed one full revolution and begins a next revolution, the values in the sigma-delta converter may be overwritten by the average value of the previously stored measurement and the current measurement. As a result, the measurements of each position of an object may be oversampled.

According to one embodiment, elements 516 and 518 may be referred to as a comb filter. In one illustrative example, the comb filter is configured to separate repetitive portion of the displacement signal associated with the rotating disk from the non-repetitive portion. Repetitive may refer to the successive revolutions of the mechanical rotation of the rotating disk. It is appreciated that the comb filter may include register where input values are accumulated over time. The pointer associated with the register is controlled by the angular position of the rotating disk. For example, 36 registers may be defined if the angular position of the rotating disk is known with a resolution of 10 degree, which is equivalent to $\frac{1}{36}^{th}$ of a revolution.

In one embodiment, the output of element 516 is the scanned output of the registers and is therefore associated with repetitive mechanical runout of the rotating disk, as measured by the sensor circuitry. Element 518 is configured to determine the non-repetitive mechanical runout by measuring the difference between the total mechanical runout of the rotating disk, as measured by the sensor circuitry, and the repetitive mechanical runout, as determined by element 516.

According to one embodiment, the noise determination circuitry 500B operates in substantially the same manner as circuit 500A. However, the controller 511 and the biasing electrodes 505 may be eliminated from the noise determination circuitry 500B. As such, the electrodes 507 corresponding to the electrodes 122 in the noise determination circuit 500B measure ambient noise as opposed to a change in potential that corresponds to the displacement of the disk 104 in circuit 500A.

A difference amplifier 550 may be used to remove the measured ambient noise from the determined displacement of the disk 104. In other words, a signal 552 representing displacement of the disk 104 without ambient noise may be generated. It is appreciated that the use of difference amplifier 550 is illustrative and not intended to limit the scope of the embodiments. For example, a component other than the difference amplifier may be used to remove the measured ambient noise.

Figure 5B:
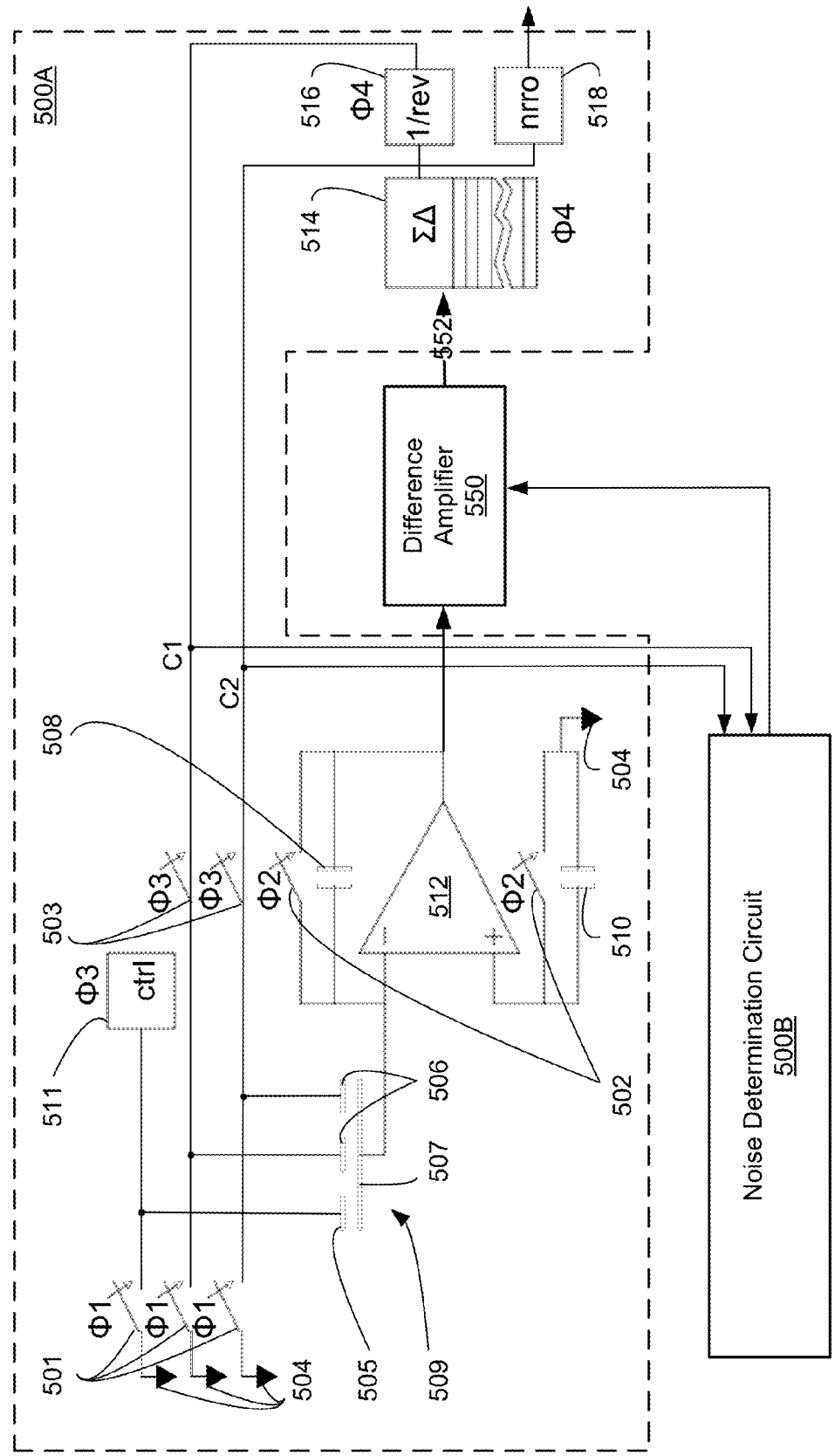
Figure 5C:
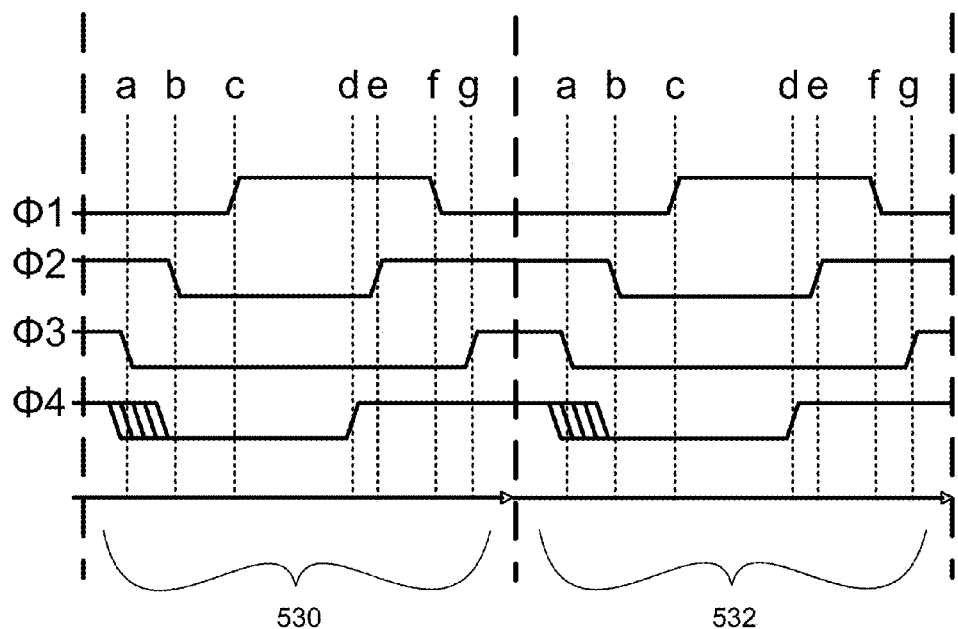
FIGS. 5C and 5D depict a circuit timing diagram of circuitry that determines the displacement of a rotating disk according to an embodiment.
Figure 5D:
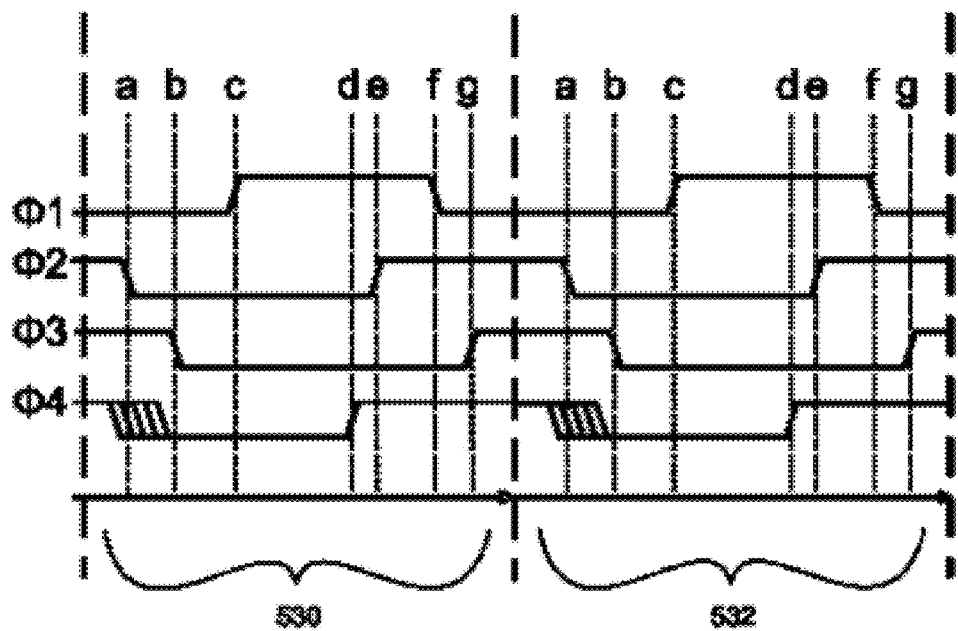

Referring now to FIG. 5B, a schematic diagram of circuitry for measuring the displacement of a rotating disk and ambient noise according to some embodiments is shown. It is appreciated that this embodiment operates substantially similar to that of FIG. 5A except that signals C1 and C2 are not generated by the noise determination circuit 500B but are rather received from circuit 500A.

Figure 6:
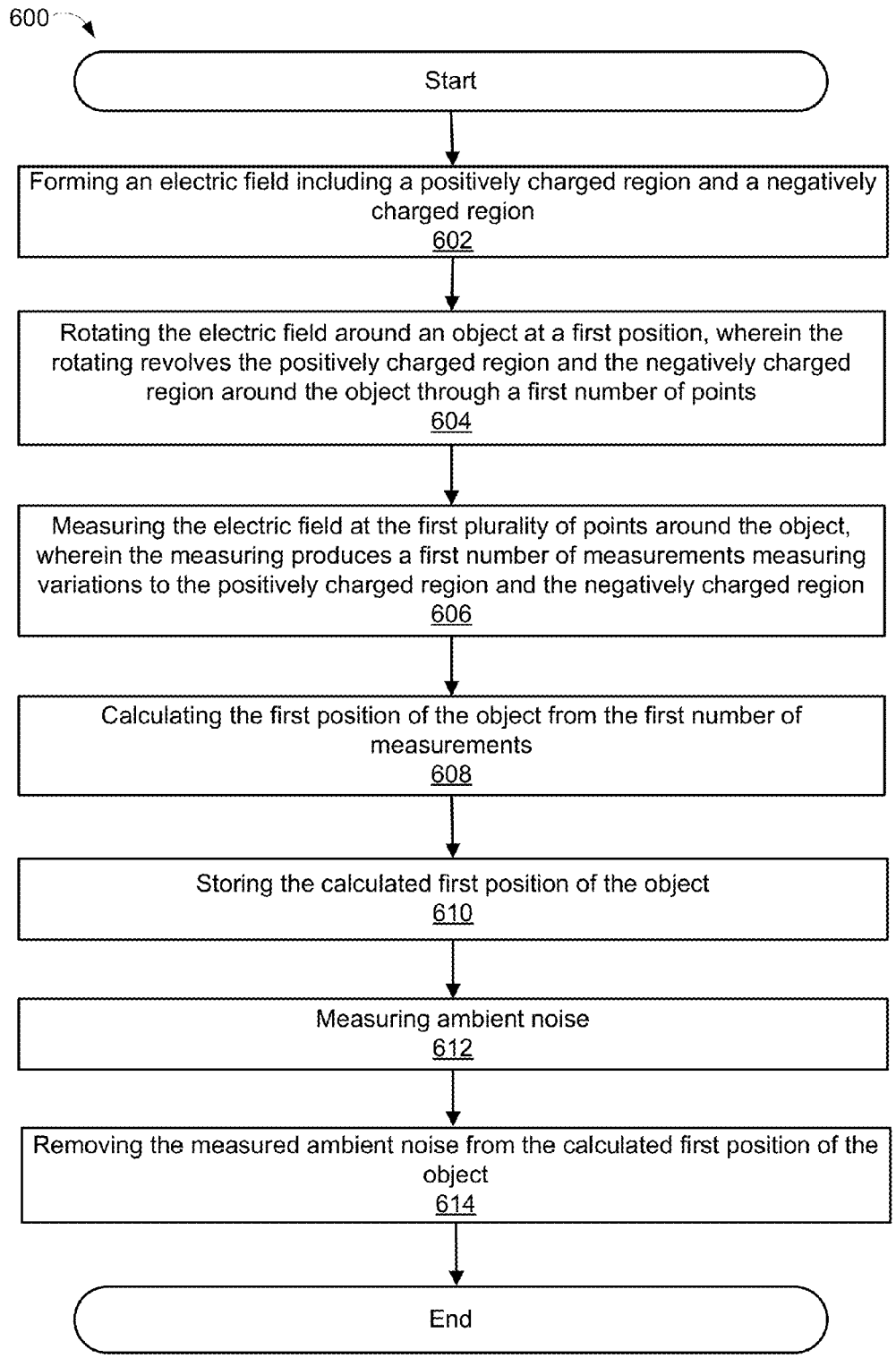
FIG. 6 depicts an exemplary flowchart for determining a displacement of an object and ambient noise according to an embodiment.

Referring now to FIG. 6, an exemplary flowchart 600 for determining the displacement of an object and measuring ambient noise in accordance with some embodiments is shown. In block 602, an electric field including a positively charged region and a negatively charged region is formed. For example, in FIG. 3A, an electric field including a positively charged region and a negatively charged region is formed.

In various embodiments, forming an electric field includes biasing a first half of a ring of a number of biasing electrodes to a positive voltage to form the positively charged region and biasing a second half of the ring of the number of biasing electrodes to a negative voltage to form the negatively charged region. For example, in FIG. 3A, an electric field is formed by biasing a first half of a ring of a number of biasing electrodes to a positive voltage to form the positively charged region and biasing a second half of the ring of the number of biasing electrodes to a negative voltage to form the negatively charged region.

In various embodiments, a first number of electrodes are disposed to form a first ring, and further operable to form the electric field around the object. For example, in FIG. 3A, a number of biasing electrodes are disposed to form a first ring including a first diameter, and further operable to form the electric field around the object. In further embodiments, a second number of electrodes are alternately disposed with the first number of electrodes within the first ring, and further operable to measure variations in the electric field attributed to a position of the object. For example, a number of floating electrodes are alternately disposed with the number of biasing electrodes within the first ring, and further operable to measure variations in the electric field.

In even further embodiments, a third number of electrodes are disposed to form a second ring and further electrically coupled with an electrical ground. For example, in FIG. 2, a number of grounding electrodes are disposed to form a second ring including a second diameter greater than the first diameter, and further electrically coupled with an electrical ground plane.

In some embodiments, the first and second number of electrodes are disposed in vias formed within a printed circuit board. For example, in FIG. 2, the biasing electrodes and floating electrodes are disposed in vias of a printed circuit board.

In an embodiment, a number of biasing circuits are operable to bias the first number of electrodes to a number of voltage levels, wherein each of the biasing circuits are coupled with at least one of the first number of electrodes. For example, in FIG. 5A, the control block 511 is coupled with at least one of the biasing electrodes and operable to bias biasing electrodes to a number of voltage levels.

In further embodiments, each of the second number of electrodes is electrically coupled with one another. For example, in FIG. 4A, each of the number of floating electrodes may be electrically coupled with one another through floating ring. In some embodiments, the first number of electrodes equals the second number of electrodes in number, and the third number of electrodes equals the sum of the number of the first and second number of electrodes. For example, in FIG. 4A, the number of biasing electrodes equals the number of floating electrodes in number, and the number of ground electrodes equals the sum of the number of the biasing and floating number of electrodes.

In an embodiment, a number of floating traces are disposed on a floating trace plane, and each of the second number of electrodes is coupled with at least one floating trace. For example, in FIG. 4A, the floating traces are disposed on a floating trace plane, and each of the number of floating electrodes is coupled with at least one floating trace.

In another embodiment, a first sensing ring and a second sensing ring may be circular with a third diameter greater than the second diameter, the first sensing ring is disposed on a plane above the floating trace plane and above at least one floating trace, and the second sensing ring is disposed on a plane below the floating trace plane and below at least one floating trace. For example, in FIG. 4A, a first sensing ring and a second sensing ring are circular with a third diameter greater than the second diameter, the first sensing ring is disposed on a plane above the floating trace plane and above at least one floating trace, and the second sensing ring is disposed on a plane below the floating trace plane and below at least one floating trace.

In a block 604, the electric field is rotated around an object at a first position, wherein the rotating revolves the positively charged region and the negatively charged region around the object through a first number of points. For example, in FIG. 3C, the electric field is rotated around an object at a first position, wherein the rotating revolves the positively charged region and the negatively charged region around the object through a first number of points along the rotational direction. In an embodiment, the rotating includes time altering a distribution of a number of electric charges on a number of biasing electrodes over the first plurality of points around the object. For example, in FIG. 3C, the distribution of a number of electric charges is time altered on the biasing electrodes, including biasing electrodes.

In a block 606, the electric field is measured at the first plurality of points around the object, wherein the measuring produces a first number of measurements measuring variations to the positively charged region and the negatively charged region. For example, in FIG. 3A, the floating electrodes measure the electric field at various points around the object to measure variations to the positively charged region and the negatively charged region.

In some embodiments, the measuring includes measuring the electric field with a number of floating electrodes. For example, in FIG. 3A, the floating electrodes measure the electric field at various points around the object to measure variations to the positively charged region and the negatively charged region.

In an embodiment, the first plurality of measurements is sampled around an approximately complete circumference of the object. For example, in FIG. 3A, the floating electrodes measure the electric field around the circumference of the object.

In a block 608, the first position of the object is calculated from the first number of measurements. For example, in FIG. 3A, the position of the object may be calculated from the first number of measurements taken by the floating electrodes.

In various embodiments, the electric field is measured at a second number of points around the object at a second position, wherein the measuring the electric field at the second number of points produces a second number of measurements, and the second position is calculated from the second number of measurements. For example, the second position may include when the electric field has rotated by one or more increments, as depicted in FIG. 3C. The second position may also include when the electric field has completed a full revolution and is again in the first position. In addition, the second position may include a second position of the object. The first and second number of measurements may be integrated to measure the electric field.

In some embodiments, the electric field is oversampled, wherein the oversampling includes taking measurements of the electric field at the first position a number of times, and wherein the oversampling is used determine a repetitive run-out component of the object, and the repetitive run-out component is removed from the measurements to determine a non-repetitive run-out component of the object. For example, in FIG. 3A, measurements of the electric field may be taken a number of times while the electric field is maintained at the same position. Further, measurements of the electric field may be taken each time the electric field has completed multiple revolutions. In FIG. 5A, the integrator and sigma-delta converter may be used to integrate and store the measurements to determine a repetitive and non-repetitive run-out component of the object.

In block 610, the calculated first position of the object is stored 610. According to one embodiment, at block 612, ambient noise is measured. For example, electrodes 122 that are positioned further away from the rotating disk 104 in comparison to the floating electrodes 112 may be used. It is appreciated that the signal detected by electrodes 122 is not modulated by the electric field generated by the biasing electrodes or by the rotating disk 104 because it is positioned further away from the rotating disk 104. At block 614, the measured ambient noise may be removed from the calculated first position using a difference amplifier. As such, a more accurate measurement associated with the displacement of the rotating disk 104 may be accomplished.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings.

What is claimed is:

1. A device comprising:
    a first plurality of electrodes, wherein each electrode of the first plurality of electrodes is configured to measure an electric field associated with a position of a rotating object;
    a second plurality of electrodes, wherein the second plurality of electrodes is configured to measure a signal associated with ambient noise, wherein the first plurality of electrodes forms a first ring structure and the second plurality of electrodes forms a second ring structure, wherein a diameter associated with the second ring structure is greater than a diameter of the first ring structure; and
    a sensing circuitry configured to receive signals from the first plurality of electrodes and the second plurality of electrodes, wherein the sensing circuitry is configured to determine displacement associated with the rotating object, and wherein the sensing circuitry is further configured to determine the ambient noise based on the signal from the second plurality of electrodes.

2. The device of claim 1, wherein variations between electric field measurements of electrodes of the first plurality of electrodes is used by the sensing circuitry to determine the displacement.

3. The device of claim 2 further comprising:
    a difference amplifier configured to remove the ambient noise from the measured displacement.

4. The device of claim 1, wherein the first plurality of electrodes and the second plurality of electrodes are disposed in vias formed in a printed circuit board.

5. The device of claim 1, wherein at least two electrodes of the second plurality of electrodes are coupled to a floating ring via a trace, wherein the floating ring and the two electrodes of the second plurality of electrodes are disposed within a same layer of a printed circuit board, and wherein the floating ring is disposed between two sensing rings, wherein each sensing ring is disposed in a different layer of the printed circuit board.

6. A printed circuit board comprising:
    an inner edge ring of the printed circuit board forming a hollow structure, wherein the inner edge ring is configured to surround a rotating object placed within the hollow structure;
    a first plurality of electrodes disposed on the printed circuit board, wherein the first plurality of electrodes is configured to measure electric fields associated with a position of the rotating object; and
    a second plurality of electrodes disposed on the printed circuit board, wherein the second plurality of electrodes is disposed further away from the inner edge ring in comparison to the first plurality of electrodes to measure a signal associated with ambient noise, wherein a distance between the second plurality of electrodes and the inner edge ring is selected such that the ambient noise signal measured by the second plurality of electrodes is more dominant than the electric field signals measured by the second plurality of electrodes.

7. The printed circuit board of claim 6, wherein the first plurality of electrodes forms a first ring structure and the second plurality of electrodes forms a second ring structure, wherein a diameter associated with the second ring structure is greater than a diameter of the first ring structure.

8. The printed circuit board of claim 6, wherein variations between electric field measurements of electrodes of the first plurality of electrodes is associated with displacement of the rotating object.

9. The printed circuit board of claim 8 further comprising:
    a difference amplifier configured to remove the ambient noise from measured displacement of the rotating object.

10. The printed circuit board of claim 6, wherein the first plurality of electrodes and the second plurality of electrodes are formed within vias.

11. The printed circuit board of claim 6 further comprising:
   a first sensing circuit coupled to the first plurality of electrodes, wherein the first sensing circuit is configured to determine displacement of the rotating object; and
   a second sensing circuit coupled to the second plurality of electrodes, wherein the second sensing circuit is configured to determine ambient noise based on signals received from the second plurality of electrodes.

12. The printed circuit board of claim 6, wherein at least two electrodes of the second plurality of electrodes are coupled to a floating ring via a trace, wherein the floating ring and the two electrodes of the second plurality of electrodes are disposed within a same layer of the printed circuit board, and wherein the floating ring is disposed between two sensing rings, wherein each sensing ring is disposed in a different layer of the printed circuit board.

13. An apparatus comprising:
   a first plurality of electrodes, wherein each electrode of the first plurality of electrodes is configured to measure an electric field associated with a position of a moving object; and
   a second plurality of electrodes disposed further away from the moving object in comparison to the first plurality of electrodes, wherein the second plurality of electrodes is configured to measure a signal associated with ambient noise, wherein the first plurality of electrodes and the second plurality of electrodes are disposed in vias formed in a printed circuit board.

14. The apparatus of claim 13, wherein the first plurality of electrodes forms a first ring structure and the second plurality of electrodes forms a second ring structure, wherein a diameter associated with the second ring structure is greater than a diameter of the first ring structure.

15. The apparatus of claim 13, wherein variations between electric field measurements of electrodes of the first plurality of electrodes is associated with displacement of the moving object.

16. The apparatus of claim 15 further comprising:
   a difference amplifier configured to remove the ambient noise from measured displacement of the moving object.

17. The apparatus of claim 13 further comprising:
   a first sensing circuit coupled to the first plurality of electrodes, wherein the first sensing circuit is configured to determine displacement of the moving object; and
   a second sensing circuit coupled to the second plurality of electrodes, wherein the second sensing circuit is configured to determine ambient noise based on signals received from the second plurality of electrodes.

18. The apparatus of claim 13, wherein at least two electrodes of the second plurality of electrodes are coupled to a floating ring via a trace, wherein the floating ring and the two electrodes of the second plurality of electrodes are disposed within a same layer of a printed circuit board, and wherein the floating ring is disposed between two sensing rings, wherein each sensing ring is disposed in a different layer of the printed circuit board.

19. An apparatus comprising:
   a first plurality of electrodes, wherein each electrode of the first plurality of electrodes is configured to measure an electric field associated with a position of a moving object; and
   a second plurality of electrodes disposed further away from the moving object in comparison to the first plurality of electrodes, wherein the second plurality of electrodes is configured to measure a signal associated with ambient noise, wherein at least two electrodes of the second plurality of electrodes are coupled to a floating ring via a trace, wherein the floating ring and the two electrodes of the second plurality of electrodes are disposed within a same layer of a printed circuit board, and wherein the floating ring is disposed between two sensing rings, wherein each sensing ring is disposed in a different layer of the printed circuit board.

* * * * *